US006888854B2

(12) United States Patent
Margalit

(10) Patent No.: US 6,888,854 B2
(45) Date of Patent: May 3, 2005

(54) INTEGRATED MONITOR DEVICE

(75) Inventor: Moti Margalit, Zichron Yaaqov (IL)

(73) Assignee: Lambda Crossing Ltd., Caesaria (IL)

(*) Notice: Subject to any disclaimer, the term of this patent is extended or adjusted under 35 U.S.C. 154(b) by 10 days.

(21) Appl. No.: 10/189,163

(22) Filed: Jul. 3, 2002

(65) Prior Publication Data

US 2004/0004978 A1 Jan. 8, 2004

(51) Int. Cl.[7] .............................................. H01S 3/30
(52) U.S. Cl. ............................ 372/6; 372/92; 372/64; 372/32; 372/38.01; 372/98; 372/102
(58) Field of Search ............................. 372/32, 18, 64, 372/98, 92, 29

(56) References Cited

U.S. PATENT DOCUMENTS

| | | | |
|---|---|---|---|
| 4,775,214 A | | 10/1988 | Johnson |
| 5,231,611 A | | 7/1993 | Laznicka, Jr. |
| 5,323,409 A | | 6/1994 | Laskoskie et al. ............ 372/32 |
| 6,034,975 A | * | 3/2000 | Harter et al. ................. 372/18 |
| 6,058,131 A | * | 5/2000 | Pan ............................ 372/102 |
| 6,134,253 A | * | 10/2000 | Munks et al. ................. 372/32 |
| 6,289,028 B1 | * | 9/2001 | Munks et al. ................. 372/20 |
| 6,385,217 B1 | * | 5/2002 | Singh et al. ................... 372/20 |
| 6,526,079 B1 | * | 2/2003 | Watterson et al. ............ 372/32 |
| 6,560,253 B1 | * | 5/2003 | Munks et al. ................. 372/32 |
| 6,587,214 B1 | * | 7/2003 | Munks ........................ 356/519 |
| 6,597,712 B2 | * | 7/2003 | Tatsuno et al. ............... 372/32 |

FOREIGN PATENT DOCUMENTS

| | | |
|---|---|---|
| WO | 9909440 | 2/1999 |
| WO | 00 29886 | 5/2000 |
| WO | 0127692 | 4/2001 |
| WO | 01 63336 | 8/2001 |
| WO | 0181962 | 11/2001 |
| WO | 02 50585 | 6/2002 |

OTHER PUBLICATIONS

Hagness, S.C. et al "FDTD Microcavity Simulations: Design and Experimental Realization of Waveguide–Coupled Single–Mode Ring and Whispering–Gallery–Mode Disk Resonators", Journal of Lightwave Technology, vol. 15, No. 11, Nov. 1997 pp. 2154–2165.

M. Koshiba, Wavelength Division Multiplexing and Demultiplexing With Photonic Crystal Waveguide Couplers, Journal of Lightwave Technology, vol. 19, No. 12, Dec. 2001 pp. 1970–1975.

Seh–Won Ahn, et al Grating Assisted Codirectional Coupler Filter Using Electrooptic and Passive Polymer Waveguides, IEEE Journal on Selected Topics in Quantum Electronics, vol. 7, No. 5, Sep./Oct. 2001 pp. 819–825.

Coldren, L. Monolithic Tunable Diode Lasers, IEEE Journal on Selected Topics in Quantum Electronics, vol. 6, No. 6, Nov./Dec. 2000 pp. 988–999.

* cited by examiner

Primary Examiner—Minsun Oh Harvey
Assistant Examiner—Armando Rodriguez
(74) Attorney, Agent, or Firm—Ladas & Parry

(57) ABSTRACT

An optical monitor device and method are presented aimed at providing low-loss monitoring of an optical signal confined in an optical guiding structure. An optical resonator structure is placed spatially adjacent to the guiding structure and is optically coupled to the guiding structure, and an optical detector is optically coupled to the resonator structure. The coupling between these elements is such that the coupling of light from the guiding structure to the optical resonator is smaller then the coupling of light from the resonator to the optical detector.

39 Claims, 7 Drawing Sheets

INTEGRATED MONITOR DEVICE

FIELD OF THE INVENTION

This invention relates to integrated optical devices, particularly useful in optical communication systems.

BACKGROUND OF THE INVENTION

Integrated optical devices provide low cost and compact alternative to systems based on bulk optics such as lenses, filters and mirrors. An important element particularly useful in optical communications is a channel analyzer. This element is based on a filter, which can either he timed across a given bandwidth, or fixed at a predetermined frequency. In both cases, the filtered output is detected and analyzed to obtain the frequency information.

In most monitoring applications, there is a need to minimize the loss of the monitored signal caused by the monitoring function. This is typically achieved by directing a small portion of the guided light to tie optical filter. This approach is disclosed in U.S. Pat. Nos. 5,323,409, 6,385, 217, 6,134,253 and 6,289,028; and is generally illustrated in FIG. 1. As shown, guided light (e.g. light generated by a laser source) propagating in a waveguide 101 interacts with a tap accommodated at a region 102 of the waveguide, and a small portion of light is directed to a spectral monitor 103 while the other portion of the guided light remains in the waveguide 101 and propagates through its successive segment 104. The loss is thus determined by the amount of light directed out of the guide (i.e., the ratio between the portion of the optical signal directed out of the guide into the filter and the initial amount of optical signal within tie guide). Minimization of loss can be obtained mainly by reducing the portion of the optical signal to be detected.

A spectral monitor can utilize resonators and micro resonators. This technique is disclosed in WO 01/81962 assigned to the assignee of the present application. Here, a spectral analysis filter is composed of two ring-base compound resonators connected in parallel through a common linear waveguide and serves as a compound high Q optical ring resonator structure. The output linear waveguide of the structure is connected to a detector. The Q of filter is determined by the coupling factor describing the amount of light that is coupled into the filter at every round trip, and is also determined by the optical losses in the cavity and the ring radius. The filter structure is connected to an optical network (link) via a tap coupler, which taps a small amount of light. The compound resonator is disclosed in WO 01/27692 assigned to then assignee of the present application, and presents a combination of two spaced-apart waveguides and at least two spaced-apart resonator-cavity loops accommodated between the two waveguides and connected to each other through sections of the waveguides, such that the spaced-apart resonator-cavity loops and the waveguide sections create a closed loop compound resonator for storing optical energy of a predetermined frequency range. The physical characteristics of compound resonator are controllable (via application of an external field, each heating) to adjust the optical storage characteristics of the compound resonator.

SUMMARY OF THE INVENTION

There is a need in the art to facilitate the monitoring of an optical device by providing a novel integrated optical device and method.

The present invention presents a new approach based on a novel interaction between resonator and an optical guiding structure (waveguide), and provides for a compact, power efficient monitoring solution. The novel aspect of the present invention pertains to a coupling method between the guiding structure (e.g., waveguide) and resonator structure, which provides for low loss on the guiding structure without the need for a tap, thus saving device real estate and simplifying the architecture. Furthermore, the present invention outlines a method for increasing the sensitivity of the detection system to enable even further loss reduction in the waveguide.

There is this provided according to one aspect of the present invention an optical monitor device comprising an optical resonator structure located spatially adjacent to a guiding structure carrying an input light signal, and an optical detector optically coupled to the resonator structure, the coupling of light from the guiding structure to the optical resonator being smaller then the coupling of light from the resonator to the optical detector.

The term "coupling" used herein signifies the ratio of the optical power transferred between two optical elements to the optical power in one of these optical elements. The coupling is determined by the overlap of the spatial distribution of the optical field in each of the optical elements, where the spatial field is determined by such parameters as the refractive indices of the elements, and their dimensions and internal structure.

The detector may be directly coupled to the resonator ("intracavity detector") or coupled through a waveguide ("detector waveguide"). If a detector waveguide is used, the coupling of the guiding structure (first waveguide) to the resonator is smaller then the coupling of the resonator to the detector waveguide.

Thus, according to another aspect of the present invention, there is provided an optical device comprising a first waveguide carrying an input light signal, an optical resonator spatially adjacent to said first waveguide, and a second waveguide spatially adjacent to said optical resonator for transfer of light from the resonator to a detector, optical coupling between the first waveguide and the resonator being smaller than optical coupling between the resonator and the second waveguide.

The ratio of the coupling between the resonator and the detector to the coupling between the guiding structure and the resonator is preferably greater than 10, and more preferably greater than 30. This coupling ratio is determined as $k_2/k_1$, wherein $k_1$ and $k_2$ are coefficients of coupling between, respectively, the resonator and the guiding structure, and the resonator and the detector or waveguide leading to the detector (e.g., trough the detector waveguide). For example, if the coupling of light from the main waveguide (guiding structure) to the optical resonator (e.g., ring waveguide) is 1%, then, 1% of the power from the main waveguide is transferred to the ring waveguide at the coupling point (optical coupler), and 99% of the power remains the main waveguide. The same applies for the detector/ring-waveguide coupling point, where if the coupling is 10%, then 10% of the light from the ring waveguide is transferred to the detector or to the waveguide leading to the detector, and 90% remains in the ring waveguide. While the coupling values determine the transfer of optical energy at a given point, the total power transferred from the main waveguide to the detector is calculated by taking into account the resonance action of the ring resonator and summing correctly the interference of the ring cavity light and waveguide light.

The optical device of the present invention may perform several operational modes of which the most dominant are: identifying individual channels' characteristics in a multi-channel transmission or providing a precise frequency reference. In the first mode of operation, the input light signal may be composed of a multitude of optical light signals, each having its particular characteristic optical frequency. The optical resonator extracts a portion of the light signal corresponding to the resonance frequency of the resonator. The resonator structure my include the so-called "sweeping" resonator operator to scan across the optical spectrum of interest contained in the input light signal. When operated in the second mode as an accurate frequency reference, the input light signal would typically be a single-channel optical signal, and the resonator would be fixed at a given frequency location. The optical power in the resonator which is detected by the detection can provide a feedback signal for changing the input signal frequency to coincide with the filter frequency. The lock can be performed by several methods as further outlined below.

The resonator structure may utilize one of the following: a closed loop waveguide resonator (ring-like), a photonic crystal, a grating-based unit, or a Fabri Perot filter, The optical device according to the invention may comprise an additional detector connected to the guiding structure (or the first waveguide) through a coupler (such as a tap) at a region of the guiding structure upstream of the resonator coupling region with respect to the direction of light propagation through the guiding structure. In this case, the resonator structure includes a stabilized resonator serving as a reference frequency (a wave locker).

The optical device according to the invention may comprise an additional resonator structure coupled to said guiding structure (or the first waveguide) and coupled to an additional detector (either directly or through an additional detector waveguide). In this case, the frequency peak (center frequency) of each of the two resonators may be set apart from each other. The frequency peaks may be set apart by a value smaller than the effective bandwidth of the resonator, in which case the two resonators are used to determine the frequency of the same channel. Alternatively, the center frequency may be set apart by a value greater than the effective bandwidth of the resonator, in which case the two resonators are used to determine frequencies of different channels ("interlaced spectral coverage").

Thus, according to yet another aspect of the present invention, there is provided an optical device comprising a guiding structure carrying a plurality of optical signals of different frequencies, at least two spatially adjacent optical resonator structures, and at least two detectors coupled to said at least two resonator structures, respectively, the coupling of the guiding structure to each of the resonators being smaller than the coupling of each of the resonators to the respective detector, and center frequencies of the resonators being set apart from each other.

According to yet another aspect of the invention, there is provided a method for monitoring light propagation through a guiding structure, the method comprising;

optically coupling a resonator structure to said guiding structure and optically coupling a detector to said resonator structure, to thereby transfer a portion of light propagating in the guiding structure to the detector;

providing the coupling between the guiding structure and the resonator structure smaller than the coupling between the resonator structure and the detector.

The coupling of the resonator-to-detector is similar in principle to the coupling of the waveguide to resonator and follows the same physical principles.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE INVENTION

Figure 1:
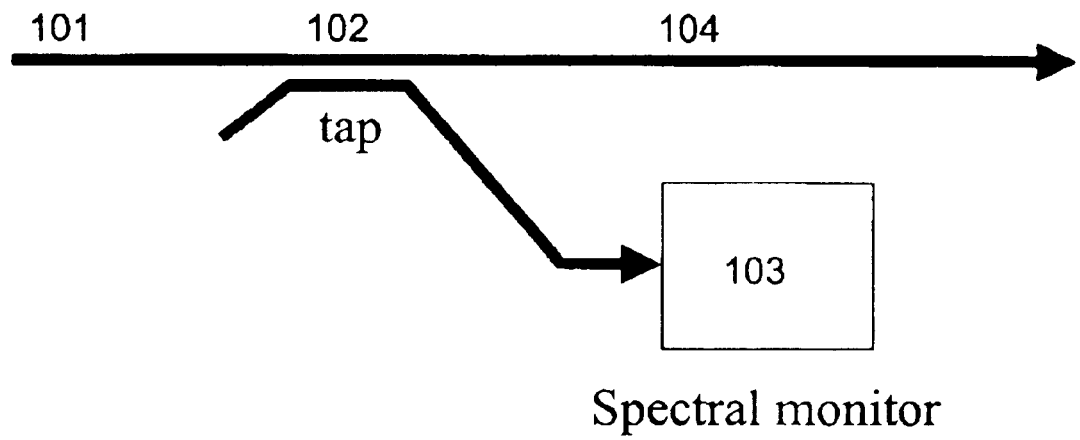
FIG. 1 is a schematic illustration of the prior art technique of the kind specified utilizing a tap and a special monitor.

FIG. 1 illustrates the principles of the prior art approach for monitoring the power of a radiation source. Here, a tap is used to separate a small portion of guided light and direct it to a spectral monitor. monitoring device 100 according to Referring to FIG. 2, there is illustrated a monitoring device 100 according to the invention. The device 100 comprises a light guiding structure (waveguide) 110 capable of carrying a plurality of optical signals (frequencies); a spatially adjacent optical resonator structure 112 coupled to the guiding structure 110 within an interaction region R that provides for transfer (coupling) of light from the light guiding structure to the resonator structure; and a detector structure 114 optically coupled to the resonator 112.

The construction is such that the coupling (coupling coefficient $k_1$) between the waveguide 110 and the resonator structure 112 is smaller than the coupling (coupling coefficient $k_2$) between the resonator 112 and the detector 114. The detector structure 114 may be coupled to the resonator through an additional waveguide (detector waveguide), which is not shown here. In this case, the parameters of the device 100 are such that the coupling of light from the waveguide 110 to the resonator 112 is smaller then the coupling of light from the resonator 112 to the detector waveguide. The parameters defining the coupling coefficients include refractive indices of the guiding structure, the resonator, and the detector waveguide, and include the dimensions of interaction regions between these elements.

For example, when using the waveguide of a 0.3 μm width, the refractive index of 3.5 and the cladding index of 1, with a gap between the waveguide and the ring varying between 0.1 to 0.3 ["FDTD Microcavity Simulations: Design and Experimental Realization of Waveguide-Coupled Single-Mode Ring and Whispering-Gallery-Mode Disk Resonator", S. C. Hagness et al., JOURNAL OF LIGHTWAVE TECHNOLOGY, VOL. 15, NO. 11, NOVEMBER 1997], the following two options for varying the coupling coefficient are evident (FIGS. 2 and 4 of this publication) to be used: One option is to change the gap between the main waveguide and the detector waveguide. If a wide gap spacing greater than 0.3 is chosen, small couplings across the wavelength range of interest can be achieved For large couplings as required by the detector waveguide, it is required to use small gaps or extend the coupling region as demonstrated when comparing FIGS. 2 and 4 of the publication, where FIG. 4 has a larger interaction region, since it describes a larger diameter ring.

The same effect of smaller coupling of light from the waveguide 110 to the resonator 112 than the coupling of light from the resonator 112 to the detector can be achieved by introducing the detector within the resonator (the so-called "intracavity detector"). To maximize power extraction, the required coupling and loss of the ring resonator should be optimized with respect to detected power.

The monitoring device 100 operates in the following manner. An input signal $L_{in}$, which may be multi-channel (multi-frequency) signal, is introduced into the guiding structure 110. When the light $L_{in}$ reaches the interaction region R, only optical channel(s) $L_0$ corresponding to the resonance condition of the resonator structure 112 is transferred into the resonator, and then transferred into the detector 114, while all the other channels of the input light remain in the waveguide 110 and proceed towards an output of the device. The power of light transmitted from the waveguide 110 into the resonator 112 is defined by the coupling between the elements of the device 100. The resonator structure may include a sweeping resonator scanning an optical spectrum of interest in the input light. It should be noted that the input light signal may be a single-channel signal, in which case the resonator is tuned to the frequency of this channel for power monitor functions, or offset to one side for frequency control applications.

Figure 2:
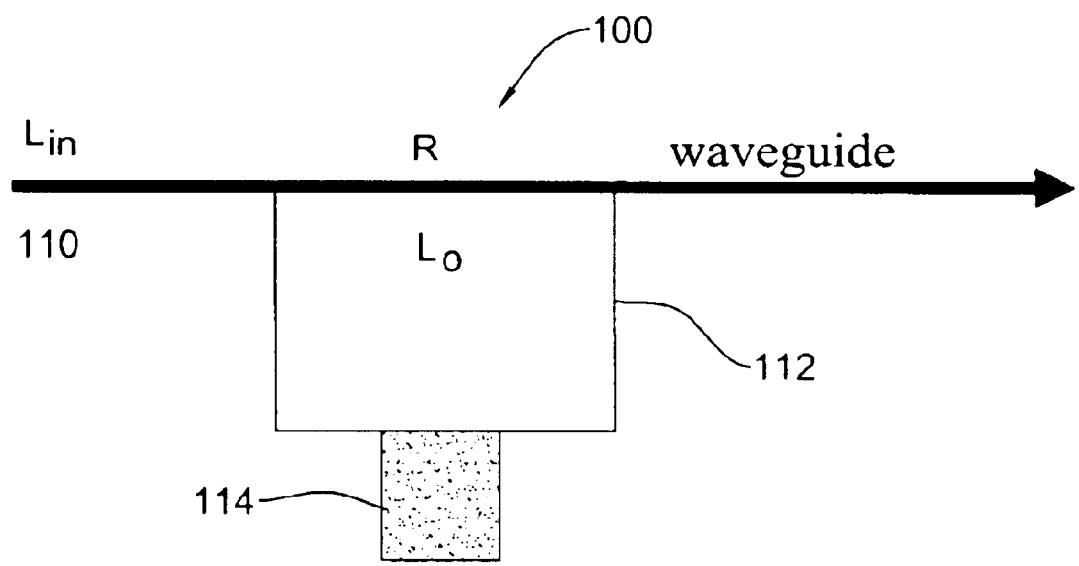
FIG. 2 is a schematic illustration of a monitor system according to the present invention.
Figure 3A:
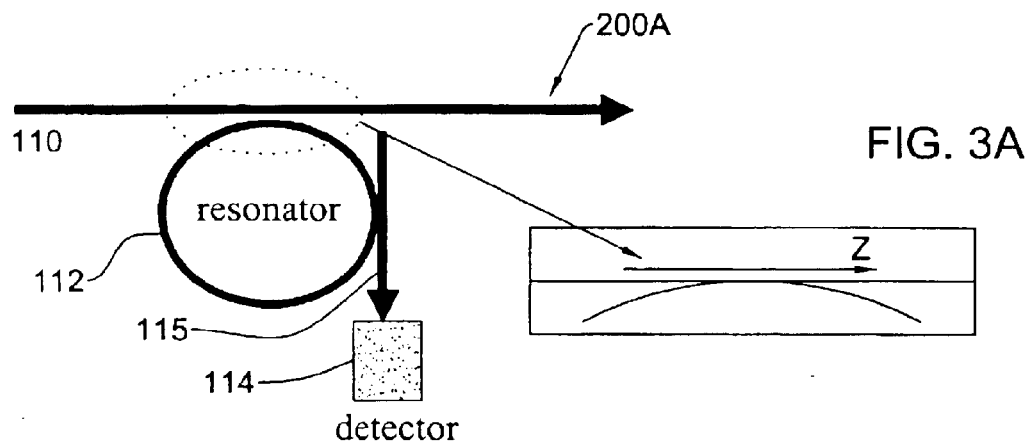
FIGS. 3A to 3D illustrate different implementations of the system of FIG. 2.
Figure 3B:
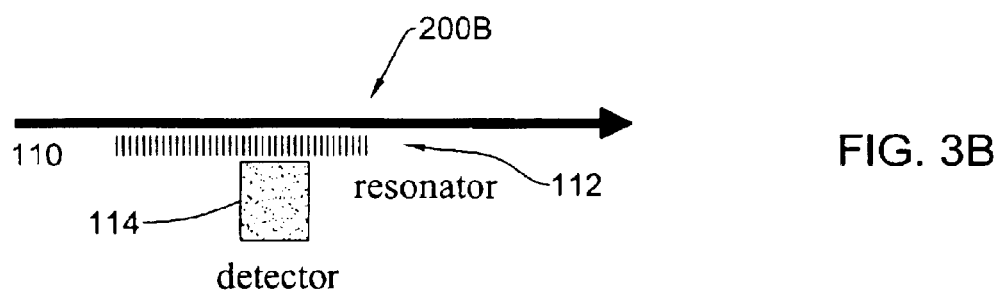
Figure 3C:
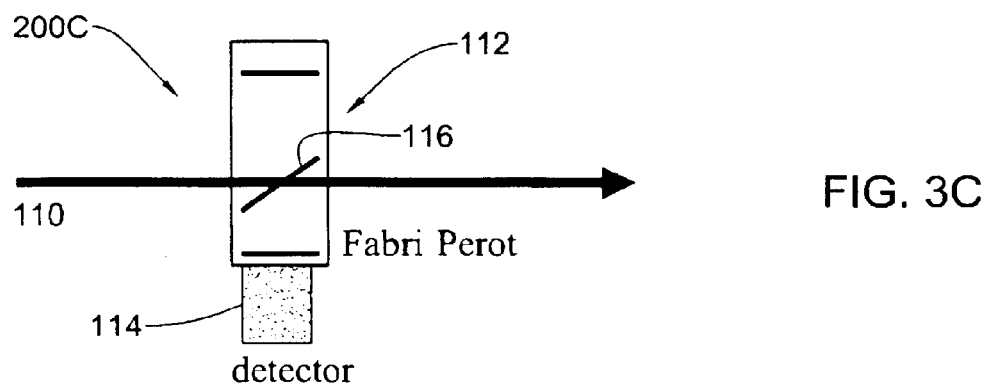
Figure 3D:
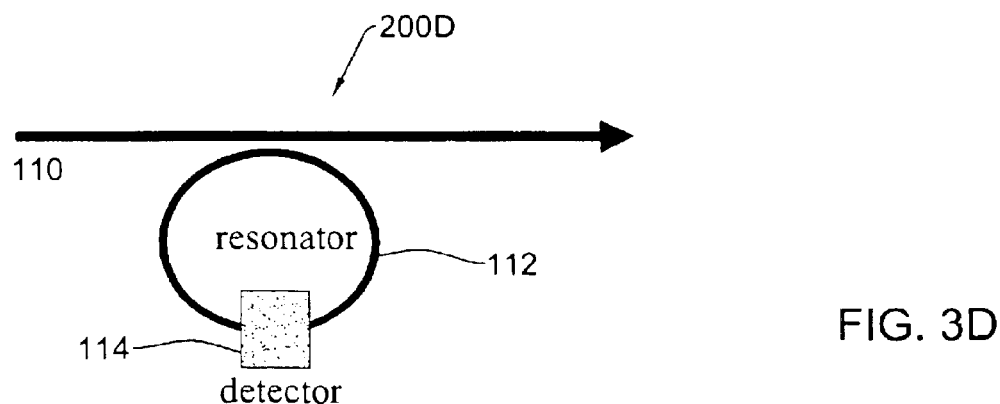

FIGS. 3A to 3D illustrate different examples of the implementation of the device of FIG. 2. To facilitate understanding, the same reference numbers are used to identify common components in all the examples of the invention. The devices of FIGS. 3A–3C differ from each other in the kind of a resonator structure used, in an integrated monitor device 200A of FIG. 3A, ring-resonator 112 is used being optically coupled to a guiding structure (waveguide) 110 within an interaction region (defined by adjacent segments of the waveguide and the ring, respectively) and is connected to a detector 114 via optical coupling between the ring-resonator 112 and a detector waveguide 115. In the example of FIG. 3B, an optical device 200B utilizes a resonator structure 112 realized using a grating resonator photonic bandgap based resonator [WO 99/09440]. The detector 114 is optically coupled to the grating resonator. In an optical device 200C (FIG. 3C), a Fabri Perot filter 112 (with two mirrors at both sided of a light propagating cavity inside the resonator) is used as the resonator structure, the detector 114 being coupled to an output of the resonator. Here, a beam splitter 116, which is a partially reflective mirror, directs a portion of the optical power into the Fabri-Perot cavity 112 and out of the cavity. The beam splitter 116 thus has the same function as the waveguide to ring coupler. The detector 114 is attached to one of the mirrors, which acts as the resonator to detector coupler. FIG. 3D shows an optical device 200D which is generally similar to that of FIG. 3A but differs therefrom in that it utilizes direct coupling between the ring monitor 112 and the detector 114, which is introduced within the resonator. In all these devices, the low-loss extraction of the resonance frequency is achieved by providing the coupling of the main waveguide (guiding structure) 110 to the resonator structure 112 significantly smaller than the coupling of light from the resonator 112 to the detector 114, either directly or via the detector waveguide 115.

The tramsmission of light through the main waveguide 110 adjacent to the optical resonator (i.e., determining the light power remaining in the waveguide 110 downstream of the region of interaction with the resonator) is given by:

$$T(\lambda) = \frac{\sqrt{1-k_1} - \sqrt{1-k_2}\sqrt{1-l}\,e^{i2\pi L/\lambda}}{1 - \sqrt{(1-k_1)(1-k_2)}\sqrt{1-l}\,e^{i2\pi L/\lambda}} \quad (1)$$

wherein $k_1$ and $k_2$ are the coupling coefficients of, respectively, the main waveguide 110 to the resonator 112, and the resonator to the detector 114 (or detector waveguide); l is the resonator loss, which is caused by the intrinsic waveguide loss of the ring resonator, $\lambda$ is the wavelength corresponding to the resonance condition of the resonator structure, and L is the resonator overall cavity length.

The transmission of light through the resonator (the drop function) is given by:

$$D(\lambda) = \frac{\sqrt{1-k_1 k_2}\,e^{i2\pi L/\lambda}\sqrt{1-l}}{1 - \sqrt{(1-k_1)(1-k_2)}\sqrt{1-l}\,e^{i2\pi L/\lambda}} \quad (2)$$

Increasing the coupling from the main waveguide to the ring waveguide ($k_1$) or to the detector ($k_2$) decreases the time during which light is trapped in the cavity (photon cavity lifetime). The throughput loss is dependant on the ratio between the coupling coefficients; as this ratio increases., i.e. $k_2$ is greater then $k_1$, the loss decreases, as will he described below with reference to FIG. 4. The present invention thus advantageously provides for limiting the amount of light extracted from the guiding structure (which is desirable for monitor applications), without the need for a tap coupler. This is achieved by providing appropriate coupling between tie elements of the device, i.e., the resonator and the main waveguide and the resonator and the detector.

In a preferred embodiment of the invention, light is guided in a waveguide structure and the resonator is realized in close proximity to the waveguide. The resonator can be a ring-resonator or a closed loop compound resonator [the above-indicated patent publication WO 01/27692, assigned to the assignee of the present application], photonic bandgap ["Waveguide Division Multiplexing and Demultiplexing With Photonic Crystal Waveguide Couplers", Masanori Koshiba, Journal of Lightwave Technology, Vol. 19, No. 12, December 2001, p.1027], or realized using a grating structure such as grating assisted coupler (GAC) that transfers light of a specific frequency band from one output of the coupler to the other [Grating-Assisted Codirectional Coupler Filter Using Electrooptic, and Passive Polymer Waveguides", Seh-Won, Ahn and Sang-Yung SHIN, IEEE Journal on Selected Topics in Quantum Electronics, Vol. 7, No. 5, September/October 2001, pp. 819–825] or sampled grating ["Monolithic Tunable Diode Lasers", L. A. Coldren, IEEE Journal On Selected Topics in Quantum Electronics. Vol. 6, No. 6, November/December 2000, p.988.

Light is evanescently coupled from the waveguide (guiding structure) 110 to the resonator 112 due to the close proximity of the waveguide to the resonator. The coupling is obtained by calculating the coupling integral of the waveguide mode and of the resonator-associated mode:

$$k = \int w_1 w_2 n(a) da \quad (3)$$

wherein $w_1$ and $w_2$ art the waveguide modes of the waveguide and resonator, respectively, $\alpha$ is the spatial element (vector), and n is the relative index of the material. The refractive index of the material is a function of a to account for the optical guiding structures.

The resulting coupling relates to the power transferred from the waveguide 110 to the resonator 112 for the a unit length, and in the absence of loss the coupling is reciprocal, meaning that the same equators are applicable also for the transfer of light from the resonator to the waveguide.

The total power coupling between two waveguides is obtained by integrating the coupling equations across the interaction distance:

$$\frac{d\psi}{dz} = \begin{bmatrix} i\delta & k \\ k & -i\delta \end{bmatrix} \psi \quad (4)$$

wherein $\psi$ is the electromagnetic field, 7. is the coordinate along the waveguide, and $\delta$ is the difference in accumulated phase between the two waveguides. In more complex cases, detailed simulation is required. [e.g., The above-indicated publication "FDTD Microcavity Simulations: Design and Experimental Realization of Waveguide-Coupled Single-Mode Ring and Whispering-Gallery-Mode Disk Resonators", JOURNAL OF LIGHTWAVE TECHNOLOGY, VOL. 15, NO. 11, NOVEMBER 1997]. The coupling equation (4) or detailed simulations account for the propagation of light in the coupling region only. The effect of the resonator on the waveguide is then analyzed (by a suitable data processing and analyzing utility which is not specifically shown) by taking the coupling value and using equation (1) and (2), which account for the resonator feedback mechanism.

Figure 4:
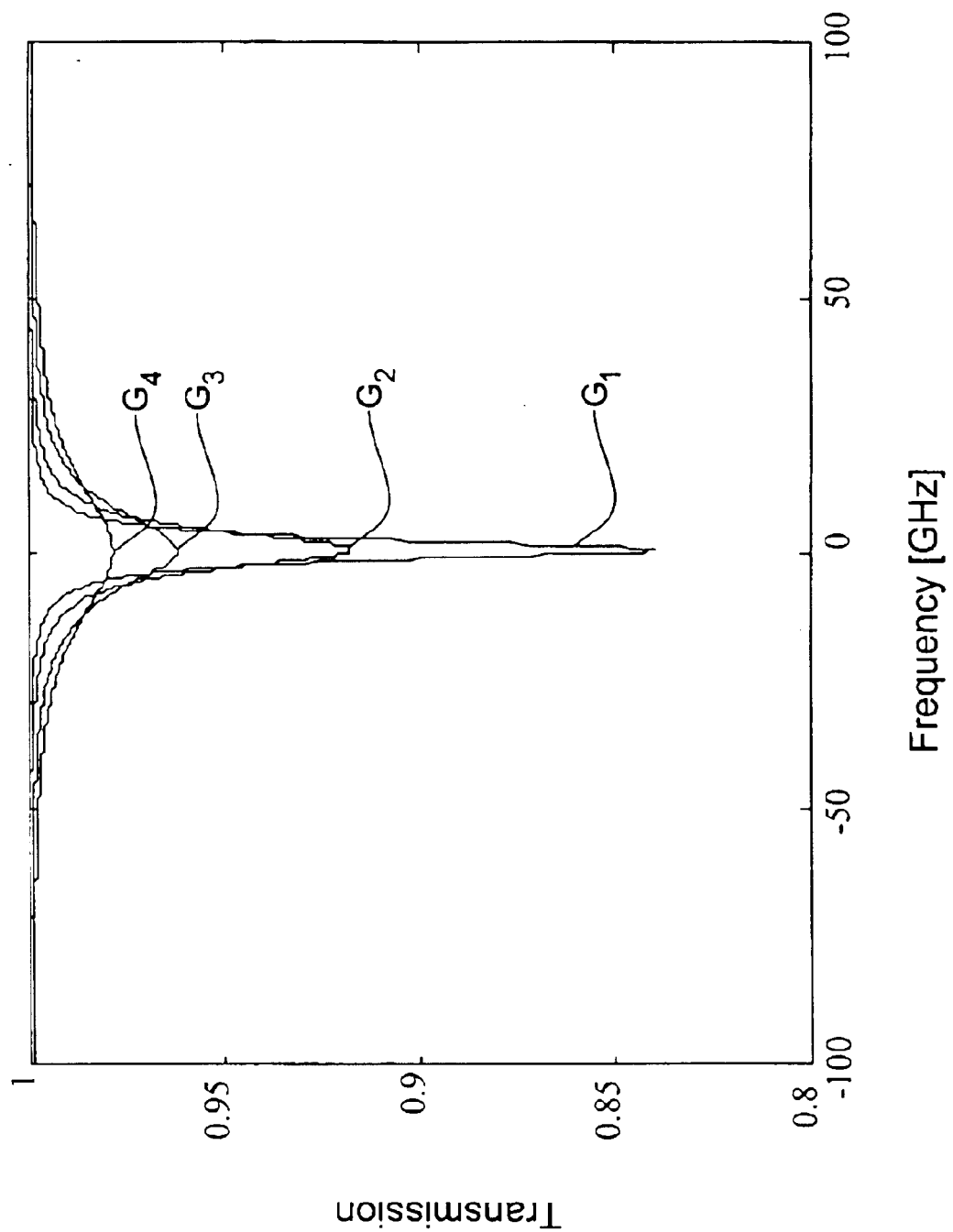
FIG. 4 compares the filter shapes for different values of a coupling ratio at a fixed 1% waveguide-to-resonator coupling coefficient.

FIG. 4 presents the results obtained from equations (1) and (2) of effective filter shapes for different coupling ratios (i.e., $k_2/k_1$) at a fixed waveguide-to-ring coupling coefficient ($k_1$) of 1%. Four graphs $G_1$–$G_4$ are shown with the coupling ratio value increasing from Graph $G_1$ to graft $G_4$, the coupling values being 10, 20, 40 and 60, respectively. As the coupling ratio increases, the filter shape becomes broader, since the Q of the cavity decreases. In addition, an increase in the coupling ratio results in a decrease of the power extracted at the resonance frequency, hence reducing the loss.

Figure 5:
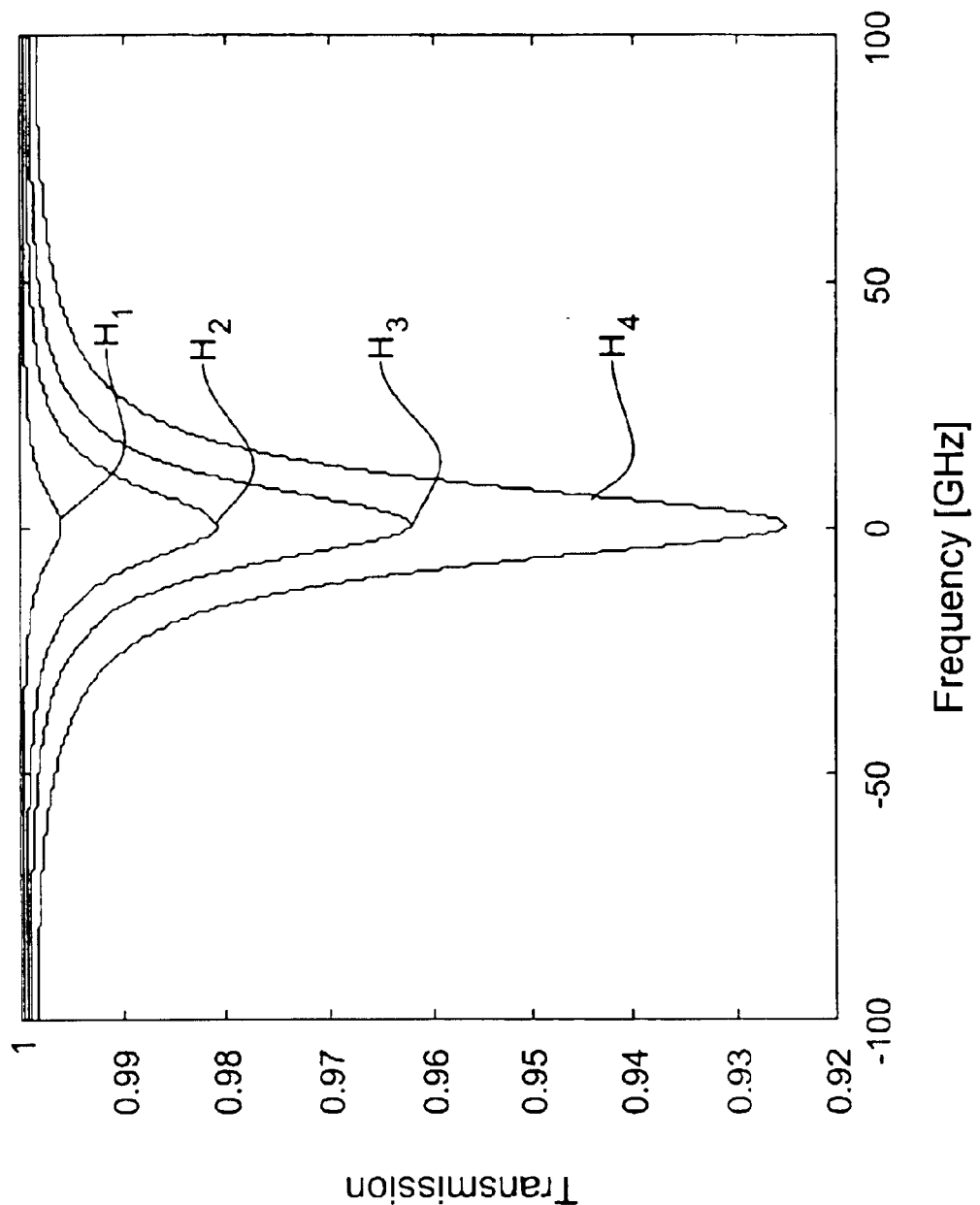
FIG. 5 compares the filter shapes for different values of the waveguide-to-resonator coupling coefficient at a fixed 5% coupling ratio.

FIG. 5 presents tour graphs $H_1$–$H_4$ showing effective filter slaw obtained with a fixed value of the coupling ratio ($k_2/k_1$-5%), and varied values of the waveguide-to-resonator coupling coefficient $k_1$: 2%, 1%, 0.5% and 0.1%, respectively. A shown, by decreasing the coupling coefficient $k_1$, the filter shape becomes narrower and the power owed at the resonance frequency decreases.

Figure 6:
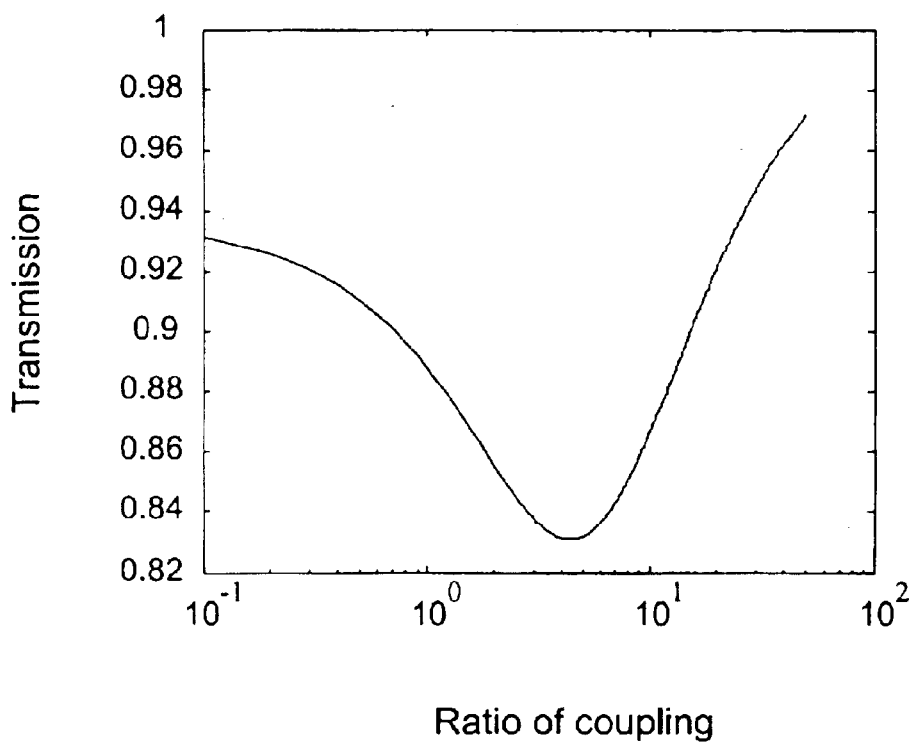
FIG. 6 illustrates the optical signal loss on the main waveguide as a function of coupling ratio.

FIG. 6 summarizes the results of the previous graphs and calculations, by plotting the loss at the resonance frequency (transmission from the waveguide to resonator) as a function of the coupling ratio $k_2/k_1$. Thus, a value of coupling ratio for small loss can be defined. If the required loss is defined to be less than 5%, required ratios need to be greater than 20, as shown in this specific example. Generally, the ratio of the coupling between the resonator and the detector to coupling between the guiding structure and the resonator, is preferably greater than 10, and more preferable greater than 30.

Figure 7:
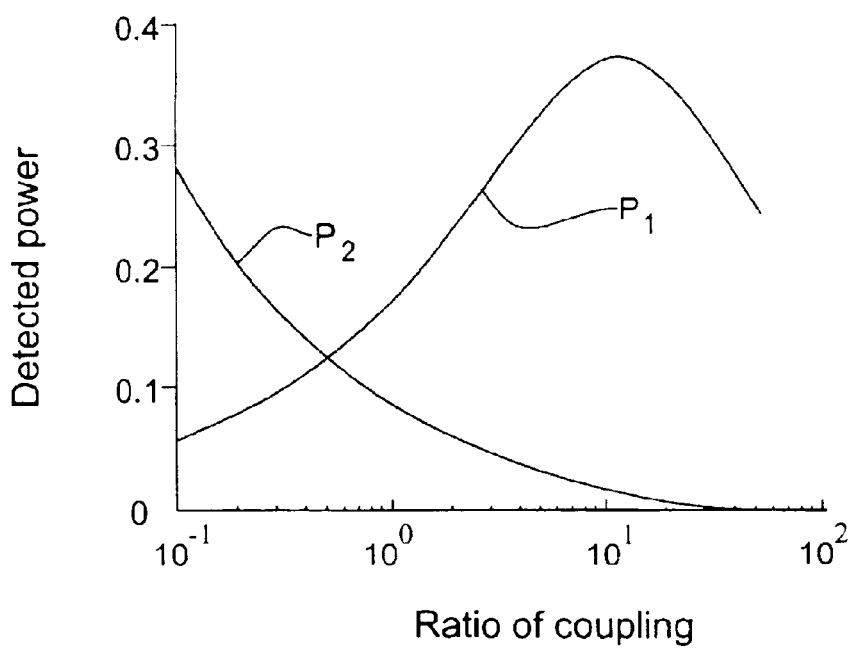
FIG. 7 illustrates die detector sensitivity as a function of coupling ratio for both the intracavity detector and the external detector with respect to the resonator structure.

By increasing the coupling ratio $k_2/k_1$ and decreasing the waveguide-to-resonator coupling coefficient $k_1$, the loss of the signal at the main waveguide 110 is reduced. However, this may undesirably affect the detected signal. In this connection, the distinguishing factor is the resonator-to-detector coupling coefficient, which can be achieved either indirectly by providing an optimal coupling between the resonator and the detector waveguide FIG. 7 illustrates the results obtained with the above two options of coupling. Two graphs $P_1$ and $P_2$ are shown presenting the power of detected light as a function of coupling ratio, and corresponding to, respectively, the detector location within the resonator cavity, and the optical coupling between the resonator and the detector waveguide. It is thus evident that the intracavity detection is preferred when the coupling ratios obtained with the various pervious external-detector examples do not enable the transfer of sufficient light into the detector due to law coupling coefficient values.

Reference is made to FIGS. 8A–8B and 9A–9B showing integrated monitoring devices 300 and 400, respectively, each utilizing two pairs of resonator-detector structures 112–114 and 112'–114' (generally, more than one pair). In both examples, a ring-based resonator structure is used.

Figure 8A:
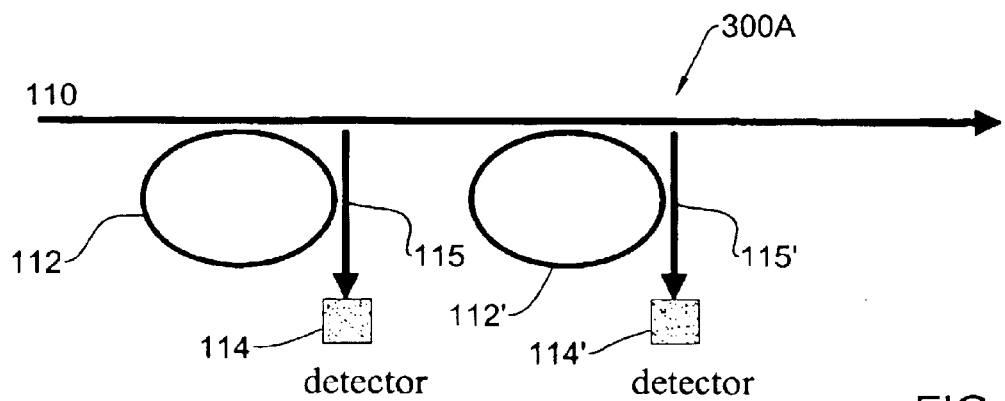
FIG. 8A illustrates a monitor device according to the invention using two ring-resonators, where central frequency is offset to the target frequency.
Figure 8B:
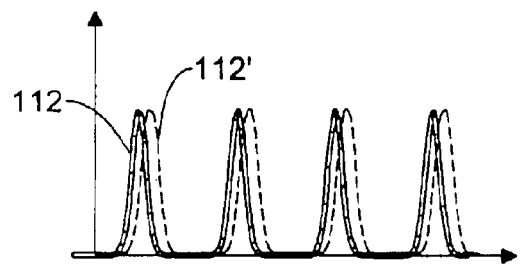
FIG. 8B shows a phase-shift between the frequencies at the two resonators in the device of FIG. 8A.

In the example of FIGS. 8A–8B the frequency peak (central frequency) of each of tie two resonators is offset to the target frequency, namely, the central frequency of one resonator is set apart from that of the other resonator a value smaller than the effective bandwidth of the resonator, and the resonators are used to determine the same frequency signal. In FIG. 8B, frequency peaks of the resonators 112 and 112' are shown in, respectively, solid and dashed cures. The detectors 114 and 114' record the power transmitted through the resonator-filters 112 and 112', respectively, and centering a target signal between the resonators is achieved when he power in both detectors are equal.

Figure 9A:
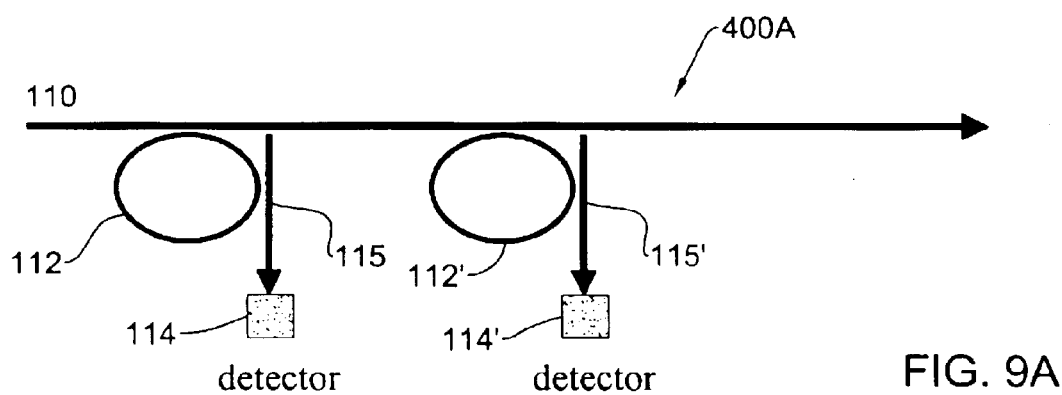
FIG. 9A illustrates a monitor device according to the invention using two ring-resonators, where the free spectral range is offset to create interlaced spectral coverage.
Figure 9B:
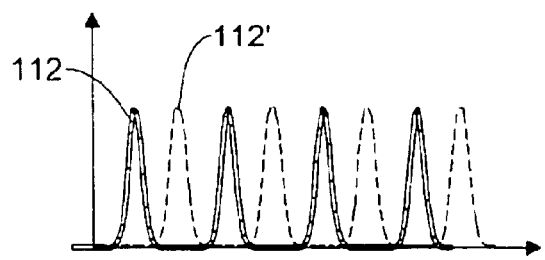
FIG. 9B shows a 90° phase-shift between the frequencies at the two resonators in the device of FIG. 9A.

In the example of FIGS. 9A–9B, the free spectral range is offset to create interlaced spectral coverage. This is associated with the following. In many cases, in order to provide a generic functionality, the resonator spectral features are repetitive over the free spectral range (FSR), which is chosen to be equal to the channel spacing. As the channel spacing becomes smaller, a smaller FSR is achieved by increasing the physical dimensions of the resonator. This creates an inherent limitation on the potential size reduction of a generic frequency stabilization device. The present invention solves the problem by choosing resonators with interlaced spectral features, thereby providing for a spectral coverage of a smaller FSR obtained with two smaller resonators. Similarly, in FIG. 9B, tie frequency peaks of the resonators 112 and 112' are shown in, respectively, solid and dashed curves. This approach can be extended to three or more resonators, and can be combined with the previous example, where each of the resonators is used to determine a different frequency signal and is formed as a mutually offset resonator pair.

Figure 10:
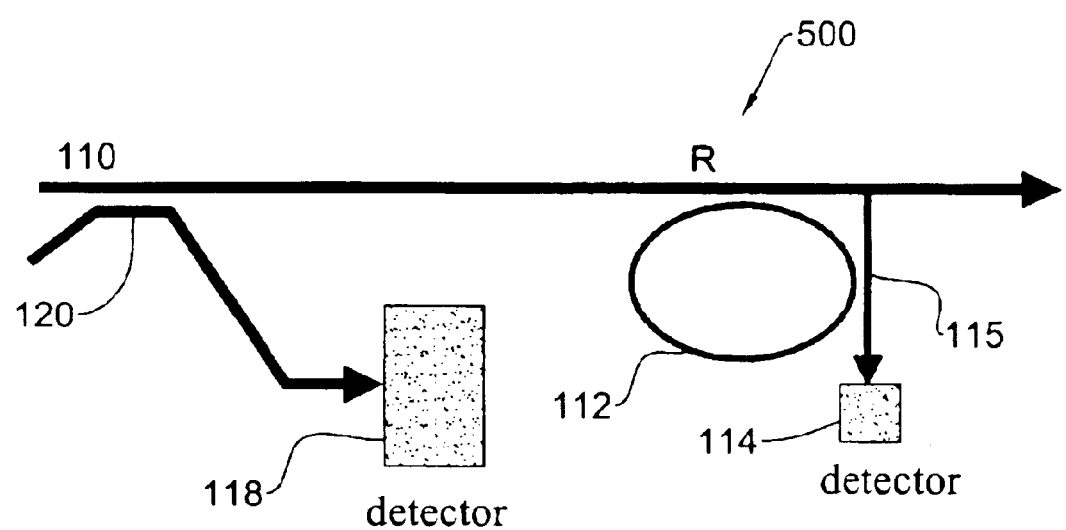
FIG. 10 shows a monitor device according to the invention, where in addition to the resonant frequency detection, an additional detector is used to measure overall power in the main waveguide.

Reference is now made to FIG. 10 illustrating yet another embodiment of the invention. Here, au optical monitor device 500 is show utilizing an additional detector 118, in addition to the resonance frequency detector 114. The detector 118 receives light extracted from the main waveguide by means of a coupler 120 such as a tap that is placed upstream of the resonator 114 with respect to the direction of light propagation through the waveguide 110. The detector 116 thus measures the overall power in the main waveguide. The measurement can serve to reference the power measured in the resonance frequency (by the detector 114) to the total power of light in the guiding waveguide 110. This feature is important for many stabilizing applications, where the resonance detected power vs. total power should be optimized. If the total power is not measured, then when the laser source is tuned according to the provided feedback, its output power may change, thus rendering the feedback mechanism inoperable.

Those skilled in the art will readily appreciate that various modifications and changes can be applied to the embodiments of the invention as hereinbefore exemplified without departing from its scope defined in and by the appended claims.

What is claimed is:

1. An optical monitor device comprising an optical resonator located spatially adjacent to a guiding structure carrying an input light signal, and an optical detector, the optical resonator being optically coupled to the guiding structure within a first interaction region between the guiding structure and the optical resonator and being optically coupled to the optical detector within a second interaction region between the optical resonator and the optical detector, refractive indices of the guiding structure, the resonator and the detector and dimensions of interaction regions being such that a coupling coefficient $k_1$ defining coupling of light from the guiding structure to the optical resonator is smaller then a coupling coefficient $k_2$ of coupling of light from the resonator to the optical detector.

2. The device according to claim 1 wherein the optical resonator is directly coupled to the optical detector, which is introduced within the resonator.

3. The device according to claim 1, wherein a ratio of the coupling coefficient $k_2$ between the optical resonator and the optical detector to the coupling coefficient $k_1$ between the guiding structure and the optical resonator is greater than 10.

4. The device according to claim 1, wherein a ratio of the coupling coefficient $k_2$ between the optical resonator and the optical detector to the coupling coefficient $k_1$ between the guiding structure and the optical resonator is greater than 30.

5. The device according to claim 1, wherein the optical resonator is coupled to the optical detector through an additional detector waveguide, the coupling coefficient $k_1$ of coupling of light from the guiding structure to the optical resonator being smaller then the coupling coefficient $k_2$ of coupling of light from the resonator to the detector waveguide.

6. The device according to claim 5, wherein a ratio of the coupling coefficient $k_2$ between the resonator and the detector waveguide to the coupling coefficient $k_1$ between the guiding structure and the resonator is greater than 10.

7. The device according to claim 5, wherein a ratio of the coupling coefficient $k_2$ between the resonator and the detector waveguide to the coupling coefficient $k_1$ between the guiding structure and the resonator is greater than 30.

8. The device according to claim 1, wherein the input light signal is a multi-frequency light signal, and the optical resonator is configured to have a certain resonance frequency to be thus operable to separate from the input light a portion corresponding to the resonance frequency of the resonator, while not affecting propagation of the input light frequencies other than that corresponding to the resonance frequency.

9. The device according to claim 8, wherein the resonator is configured as a sweeping resonator operable to scan across a predetermined frequency range contained in the input light signal.

10. The device according to claim 1, wherein the input light signal is a single-channel signal.

11. The device according to claim 10, wherein the resonator is configured and operable to extract a predetermined power portion of the input light signal.

12. The device according to claim 10, wherein light detected by the optical detector is used to provide a feedback mechanism for adjusting the optical frequency of the input light signal.

13. The device according to claim 1, comprising an additional detector connected to the guiding structure through a coupler configured for directing a portion of the input light to the additional detector, said coupler being located upstream of the resonator with respect to the direction of the input light propagation through the guiding structure towards the resonator, the resonator including a stabilized resonator serving as a reference frequency.

14. The device according to claim 1, wherein the resonator has a configuration selected from the group consisting of; a closed loop waveguide, a photonic crystal, a grating, and a Fabri Perot cavity.

15. The device according to claim 1, comprising an additional resonator located adjacent to said guiding structure and being optically coupled to said guiding structure within a first additional interaction region between the additional resonator and said guiding structure and optically coupled to an additional detector within a second additional interaction region between the additional resonator and the additional detector, a coupling coefficient of coupling of light from the guiding structure to the additional resonator the being smaller than a coupling coefficient of coupling of light from the additional resonator structure to the additional detector, the resonators being configured such that a center frequency of one of the resonators is set apart from a center frequency of the other resonator.

16. The device according to claim 15, wherein the center frequency of one of said resonators is set apart from the center frequency of the other resonator by a value smaller than an effective bandwidth of the resonator, the two resonators thus separating the same frequency component of the input light.

17. The device according to claim 15, wherein the center frequency of one of the resonators is set apart from the center frequency of the other resonator by a value greater than an effective bandwidth of the resonator, the two resonators thus separating different frequency components, respectively, of the input light.

18. The device according to claim 17, wherein each of the two resonators comprises a pair of resonators, a center frequency of one resonator in the pair being set apart from a center frequency of the other resonator in the pair by a value smaller than the effective bandwidth of the resonator, the two resonators in the pair thus separating the same frequency component of the input light.

19. An optical monitor device comprising a light guiding structure carrying a multi-channel input light signal, an optical resonator located spatially adjacent to the guiding structure and optically coupled thereto within a first interaction region, and an optical detector accommodated so as to be optically coupled to the resonator within a second interaction region, refractive indices of the guiding structure, the resonator and the detector and dimensions of the interaction region being such that a coupling coefficient $k_1$ of coupling of light from the guiding structure to the optical resonator being smaller then a coupling coefficient $k_2$ of coupling of light from the resonator to the optical detector.

20. The device according to claim 19, wherein the optical resonator is configured and operable to separate from the input light a predetermined frequency range thereof corresponding to a resonance frequency of the resonator by allowing propagation of this predetermined frequency range through the resonator and preventing all other frequencies of the input light from entering the resonator.

21. The device according to claim 19, wherein the resonator includes a sweeping resonator operable to scan across a predetermined optical spectrum contained in the input light signal.

22. The device according to claim 19, wherein the optical resonator is coupled to the optical detector through an additional detector waveguide, the coupling coefficient $k_1$ of coupling of light from the guiding structure to the resonator being smaller than the coupling coefficient $k_2$ of light coupling from the resonator to the detector waveguide.

23. The device according to claim 19, wherein a ratio of the coupling coefficient $k_2$ between the resonator and the optical detector to the coupling coefficient $k_1$ between the guiding structure and the resonator is greater than 10.

24. The device according to claim 19, wherein a ratio of the coupling coefficient $k_2$ between the resonator and the optical detector to the coupling coefficient $k_1$ between the guiding structure and the resonator is greater than 30.

25. An optical monitor device comprising a light guiding structure carrying an input light signal, an optical resonator spatially adjacent to the guiding structure and optically coupled thereto within a first interaction region, and an optical detector optically coupled to the resonator through a detector waveguide within a second interaction region, the device being configured such that a coupling coefficient $k_1$ of coupling of light from the guiding structure to the optical resonator being smaller than a coupling coefficient $k_2$ of coupling of light from the resonator to the detector waveguide.

26. An optical monitor device comprising a light guiding structure carrying an input light signal, an optical coupler associated with a first region of the guiding structure to transfer a portion of the input light to a first detector, an optical resonator spatially adjacent to the guiding structure and optically coupled thereto within a second interaction region downstream of said first region with respect to the direction of the input light propagation through the guiding structure, and an optical detector optically coupled to the resonator structure within a third interaction region, the device being configured such that a coupling coefficient $k_1$ of coupling of light from the guiding structure to the optical resonator is smaller than a coupling coefficient $k_2$ of coupling of light from the resonator to the optical detector.

27. An optical monitor device comprising a light guiding structure carrying an input light signal, a first optical resonator spatially adjacent to the guiding structure and optically coupled thereto within a first interaction region, a first optical detector optically coupled to the first resonator within an interaction region, a second optical resonator spatially adjacent to the guiding structure and optically coupled thereto within a second interaction region, and a second-optical detector optically coupled to the second resonator within an interaction region, the resonators being configured such that a center frequency of the first resonator is set apart from a center frequency of the second resonator, refractive indices of the guiding structure, the resonators and the detectors and dimensions of the interaction regions being such that a coupling coefficient of coupling of light from the guiding structure to the first optical resonator is smaller than a coupling coefficient of coupling of light from the first resonator to the first optical detector, and a coupling coefficient of coupling of light from the guiding structure to the second optical resonator is smaller than a coupling coefficient of coupling of light from the second resonator to the second optical detector.

28. A method for monitoring light propagation through a guiding structure, the method comprising:
optically coupling a resonator to said guiding structure within a first interaction region between them, and optically coupling a detector to said resonator within a second interaction region between them, to thereby enable exacting a predetermined light portion from light propagating in the guiding structure and allowing its propagation through the resonator to the detector;
providing a coupling coefficient of coupling of light between the guiding structure and the resonator smaller than a coupling coefficient of coupling of light between the resonator structure and the detector.

29. The method according to claim 28, comprising providing a ratio of the coupling coefficient-between the resonator and the optical detector to the coupling coefficient between the guiding structure and the resonator is greater than 10.

30. The method according to claim 28, comprising providing a ratio of the coupling coefficient between the resonator and the optical detector to the coupling coefficient between the guiding structure and the resonator is greater than 30.

31. The method according to claim 28, comprising directly coupling the resonator to the detector by introducing the detector within the resonator.

32. The method according to claim 28, comprising coupling the resonator to the detector through a detector waveguide, such that the coupling coefficient between the guiding structure and the resonator is smaller than the coupling coefficient between the resonator and the detector waveguide.

33. The method according to claim 28, comprising operating the resonator to extract from multi-channel light in the guiding structure the predetermined light portion including a frequency range corresponding to a resonance frequency of the resonator.

34. The method according to claim 28, comprising operating the resonator to scan across a predetermined optical spectrum contained in the multi-channel light in the guiding structure.

35. The method according to claim 33, comprising analyzing the extracted portion of the multi-channel light received by the detector to identify characteristics of individual channels in the multi-channel transmission through the guiding structure.

36. The method according to claim 33, comprising analyzing the extracted portion of the multi-channel light received by the detector to provide a precise frequency reference.

37. The method according to claim 28, comprising fixing a resonance frequency of the resonator at a given frequency corresponding to single-channel light propagating through the guiding structure, and analyzing the extracted portion of light received by the detector to provide a feedback signal for changing the frequency of the light signal in the guiding structure to coincide with the resonance frequency of the resonator.

38. The method according to claim 28, comprising coupling an additional detector to the guiding structure within an additional interaction region between them upstream of the interaction region between the guiding structure and the resonator with respect to a direction of light propagation through the guiding structure towards the resonator, to thereby detect a portion of light extracted from the guiding structure at said additional interaction region and measure overall light power in the guiding structure.

39. The method according to claim 38, comprising analyzing the overall light power measurement to provide reference of detected power of a resonance frequency of the resonator to the overall power of light in the guiding structure.

* * * * *